United States Patent [19]
Patinet

[11] 4,254,728
[45] Mar. 10, 1981

[54] DEVICE FOR MOORING AND CONNECTING A SUBMARINE CONDUIT, AND METHOD EMPLOYING THE SAID DEVICE

[75] Inventor: Jean-François Patinet, Paris, France

[73] Assignee: Compagnie Generale pour les Developpements Operationnels des Richesses Sous-Marines "C.G. Doris", Paris, France

[21] Appl. No.: 886,061

[22] Filed: Mar. 13, 1978

[30] Foreign Application Priority Data

Mar. 18, 1977 [FR] France ................................. 77 08190

[51] Int. Cl.³ ............................................. B63B 21/00
[52] U.S. Cl. ..................................... 114/230; 29/429; 166/350
[58] Field of Search .................... 9/8 P, 8 R; 114/230; 29/421, 429, 321; 285/18, 304; 294/66 R; 166/338, 341, 342–344, 350

[56] References Cited
U.S. PATENT DOCUMENTS 3,298,092  1/1967  Dozier et al. ........................... 29/429
3,835,655  9/1974  Oliver ................................... 166/350
4,086,778  5/1978  Latham et al. ........................... 29/429

Primary Examiner—Trygve M. Blix
Assistant Examiner—Jesús D. Sotelo
Attorney, Agent, or Firm—Neil F. Markva

[57] ABSTRACT

An assembly for mooring a submarine conduit to a pipeline or a fixed structure such as a storage tank. The assembly comprises a mooring head, a fixed mooring frame and a movable mooring arm. The mooring head is fixed to the end of the conduit to be connected. The mooring arm is mounted on the fixed mooring frame and is effective to receive the mooring head. The mooring arm is displaceable in a horizontal plane on the mooring frame. An end of the pipeline to which the conduit is to be connected is located on the rotational axis of the mooring arm. A junction pipe connects the end of the conduit to the end of the fixed pipeline. A cable attached to the mooring head passes through the mooring arm and is attached to a winch on the surface for drawing the mooring head into engagement with the mooring arm.

14 Claims, 3 Drawing Figures

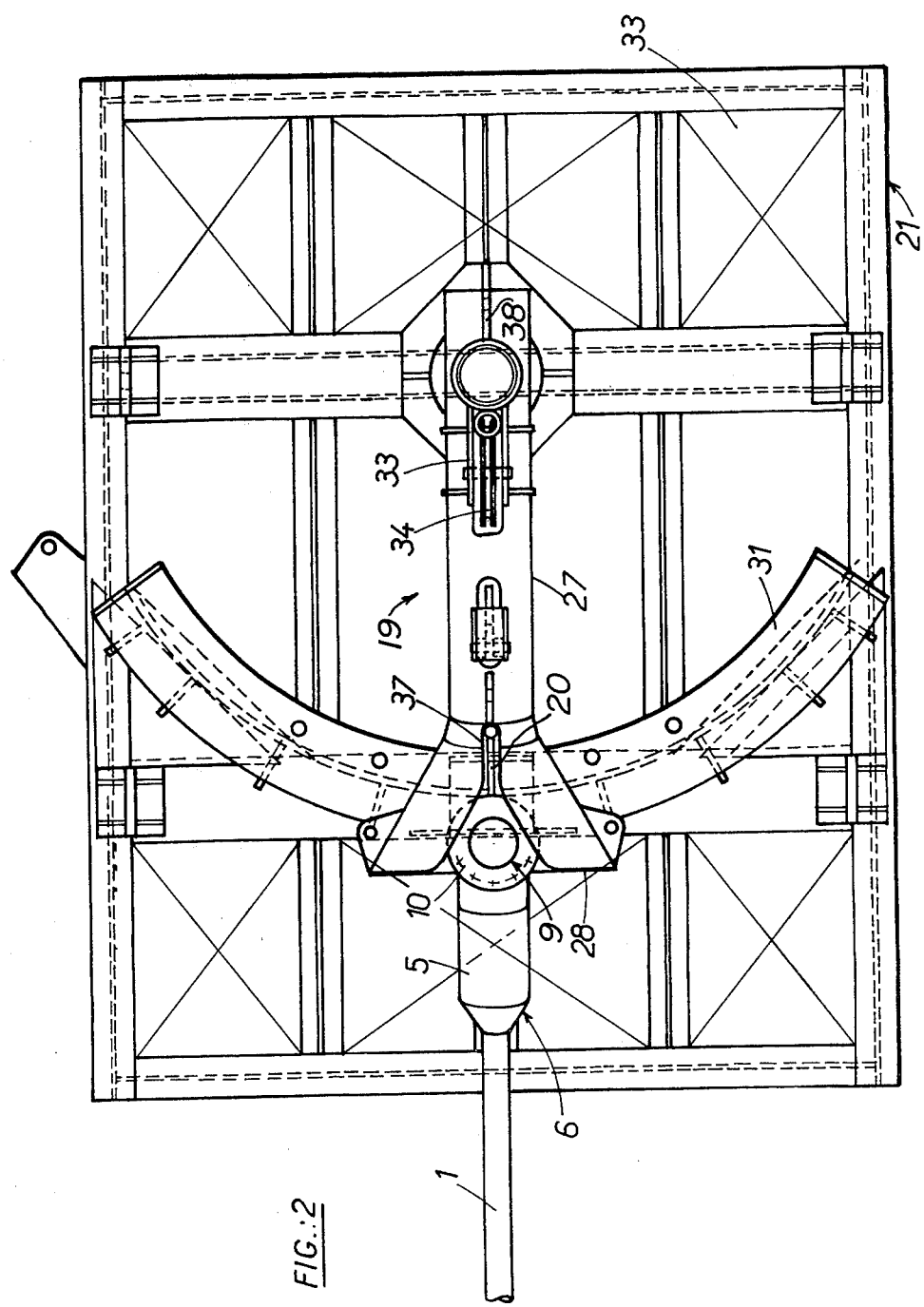

4,254,728

DEVICE FOR MOORING AND CONNECTING A SUBMARINE CONDUIT, AND METHOD EMPLOYING THE SAID DEVICE

FIELD OF THE INVENTION

The invention relates to an assembly for mooring and connecting a submarine conduit to a pipeline or to a fixed structure, the submarine conduit to be connected being, at least temporarily, maintained in hydrostatic equilibrium by a lightening system (floats, etc.), and a method of mooring employing the assembly.

BACKGROUND OF THE INVENTION

Theoretically, the connecting of a submarine conduit to another pipeline or to, for example, a storage tank, presents no difficulty whatever. Nevertheless, in practice, problems arise. In fact, in spite of all precautions taken, it frequently happens that deviations occur with ragard to the predicted direction and distance. Deviations regarding direction only present slight inconvenience but distance deviations are more serious. If, for example, the conduit is intended to connect a well to a storage tank, the tank, which consists of a large volume construction sometimes submerged at a considerable depth, cannot be located with great precision from the surface. To deal with these difficulties, French Pat. No. 2,093,171 proposes a device consisting of a semi-circular collector fixed to the wall of the tank. This collector carries, at specified spacings, branches allowing connection at whatever position the conduit arrives. A belt consisting of two rails parallel to each other and to the collector is fixed on the tank and allows the movement of a cradle on which the arriving end of the conduit is fixed. The cradle supporting the conduit is then fixed with the aid of bolts and connection elements are arranged between the conduit and one of the branches of the collector. The number and the length of these elements is selected in a manner to bring about an exact connection to one of the branches of the collector. The various positioning operations of the cradle and the connecting operation have to be carried out by divers. While this solution is suitable for connections at shallow depth, the above described device cannot be used when great depths are reached. In fact, it is then out of the question to use divers and the lack of precision of operating at great depths does not permit, with known devices, the use of connection tubing or pins of standard dimensions.

SUMMARY OF THE INVENTION

The object of the invention is to provide a mooring and connecting assembly permitting the mooring of the end of a submarine conduit at an exactly specified distance in relation to the end of another conduit occupying a definite position and the connecting of the ends of the two conduits by a standard junction pipe.

According to the invention, an assembly for mooring and connecting a submarine conduit to a pipeline or fixed construction comprises a mooring head, a fixed mooring frame and a movable mooring arm. The submarine conduit to be connected is maintained in hydrostatic equlibrium by a lightening system. The mooring head is fixed to the end of the conduit to be connected. The mooring arm is displaceably arranged on the mooring frame to rotate in a horizontal plane. An end of a fixed pipeline is located on the rotational axis of the movable arm. A junction pipe is used to connect the end of the conduit to the end of the fixed pipeline.

The mooring head may consist of a body which is cylindrical in part attached to the end of the conduit and co-axial therewith. The mooring head includes a lateral passage for the end of the conduit to be connected, expandable means for fixing the mooring head to a towing cable, means for mooring the mooring head to the movable arm, and positioning means fixed to the cylindrical body in a manner to ensure a definite angular position, with respect to the vertical, of the end of the conduit to be connected.

The mooring frame may feature a chassis which can be subjected to ballast, a vertical plinth fixed to the chassis, a column coaxial with the plinth, and a movable arm having one end movably mounted around the column. The other end of the movable arm includes annular crown co-axial with the column, fixed to the chassis and cooperating with the skid and a device preventing the skid separating from the crown.

The movable arm may comprise a cylindrical hollow portion and a conical portion. The cylindrical portion has a diameter allowing the passage of a cylindrical part of the mooring head. The conical portion extends the cylindrical portion on the side of its movable end. A cable or pulling line guidance device is fixed on the cylindrical portion and near to the fixed end of the arm thereby ensuring the guidance of the cable from the outside to the inside of the cylindrical portion. That is, the pulling line guidance device is for guiding a pulling line connected to the mooring head to be pulled to the movable mooring arm. An abutment device is located on the inside of the cylindrical portion for the mooring head. A locking device passes through the wall of the cylindrical portion to cooperate with mooring means on the mooring head. A slot at the movable end of the cylindrical portion of the arm cooperates with positioning means disposed on the mooring head. A slot has edges diverging toward the opening of the conical portion, and parallel edges continuing said diverging edges to permit the passage of the positioning means and the end of the conduit to be connected.

In a particular embodiment of the invention a strut is disposed along the lower generatrix of the arm from one end to the other thereof. Positioning means for the mooring head are fixed in the vertical plane passing through the axis of the end of the conduit to be connected.

Fixing means are provided on the crown and on the skid to fix the arm in the final position after mooring the conduit.

The junction pipe may be in the shape of an inverted U or may consist of an automatic connector system.

In a method, according to the invention, the above described assembly is employed. A hauling cable is passed over cable guiding means, one end of which cable emerges from the movable mooring arm. The two ends of the cable are held on the surface. The end of a towing cable of the conduit to be moored is attached, on the surface, or at a shallow depth to the hauling cable. The end of the conduit to be connected rising vertically on the body of the mooring head is fitted with a float to keep it in its mooring position. The towing cable is attached to the end of the mooring head (the length of the cable depending on the depth of the water). The conduit is submerged with the end of the towing cable attached to the end of the hauling cable. The hauling cable is hauled by a winch until the towing cable reaches the winch. The towing cable is then attached to the winch and hauled dragging the conduit into the movable arm of the mooring frame. Expandable means of attachment are actuated, when the mooring head is moored, to detach the towing cable from the mooring head. The float supporting the end of the conduit is freed and the junction pipe is put in place between the end of the conduit and the end of the fixed pipeline.

BRIEF DESCRIPTION OF DRAWINGS

The following description, given by way of example, allows a full understanding of how the invention can be carried out, reference being made to the accompanying drawings in which:

FIG. 2 is a plan view of the device of FIG. 1.

FIG. 3 is a side elevational view showing the coupled conduit and pipeline of the device shown in FIG. 1.

Figure 1:
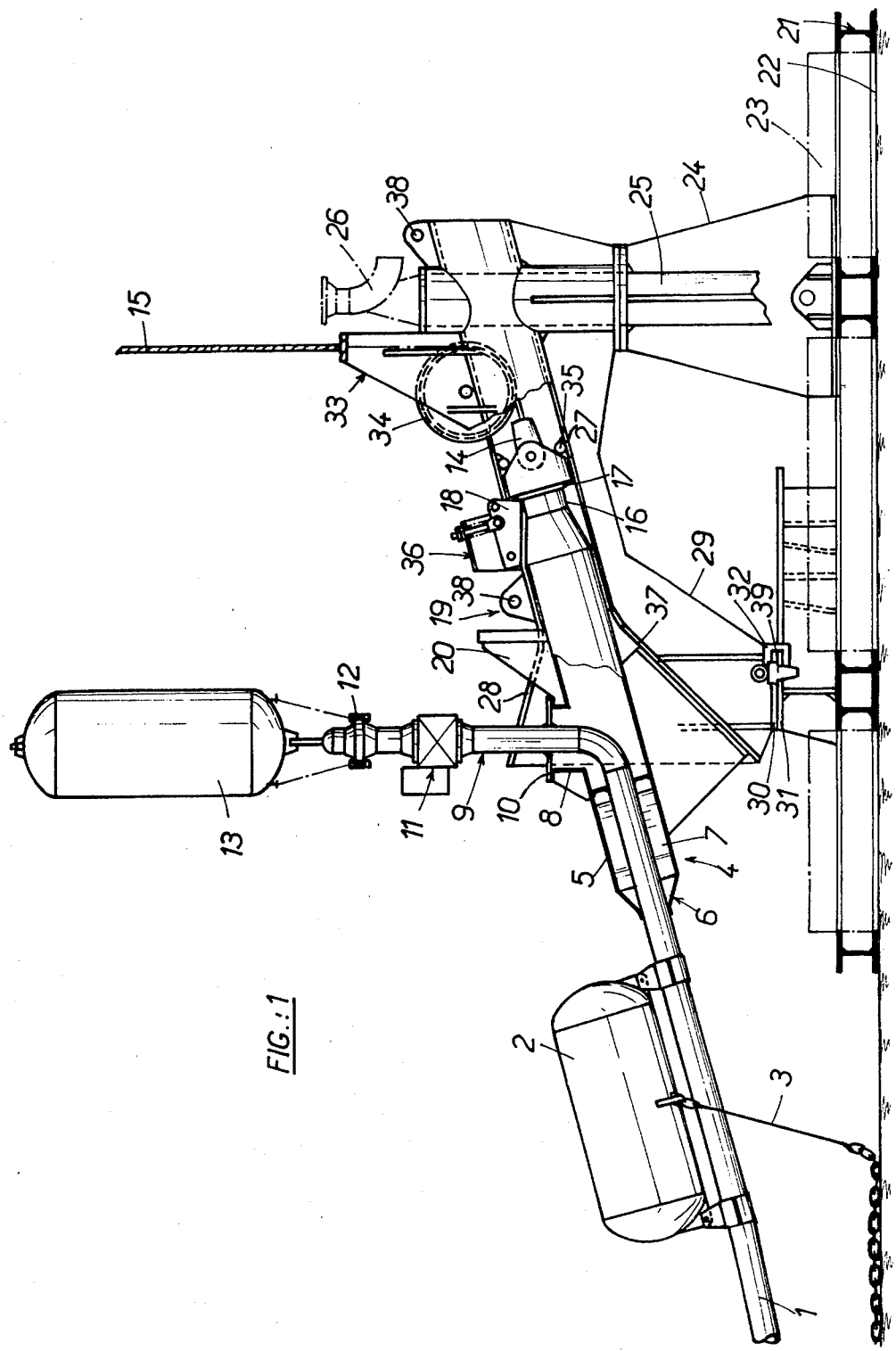
FIG. 1 is a side view, partly in section, of a device according to the invention.

In the embodiment of the invention shown in FIGS. 1 and 2, the conduit is shown moored but not yet connected.

DETAILED DESCRIPTION

A submarine conduit 1, is kept in hydrostatic equilibrium by a system comprising a float 2 and a guide rope 3, and carries a mooring head 4 on its end which is to be connected. Mooring head 4 consists of a cylindro-conical body 5 fixed coaxially to conduit 1. According to the embodiment shown, the conical end 6 is welded to the periphery of conduit 1, a centering device 7 being arranged in the cylindrical part. A lateral exit is provided for the connection end of the conduit and comprises a collar or ferrule 8 welded on to an opening in the wall of the cylindrical body. The angle formed by collar 8 with respect to the axis of mooring head 4 will depend on the final slope of mooring head 4 and will, for preference, be such that the axis of ferrule or collar 8, and consequently the end 9 of conduit 1, is vertical. End 9 of conduit 1 is kept coaxial to ferrule 8 by passing through a flange 10 welded to ferrule 8 and to conduit end 9.

Conduit end 9 is fitted with a valve 11 closed by a flange 12. The flange 12 is furnished with a device ensuring closure of the valve exit and the provisional fitting of a lightener float 13.

The part of the body 5 situated remote from the conduit 1 bears on its end expandable means 14 for connecting the body to a cable 15. Finally, mooring head body 5 includes a neck 16 having a rim 17 comprising an abutment surface cooperating with locking means 18 fixed on a movable hollow arm 19 which will be described later on. The mooring head body 5 bears a positioning member 20 fitted in a manner to ensure a precise angular positioning of the conduit end 9.

A mooring frame secures the end of conduit 1 and allows its connection to a pipeline or fixed structure. The mooring frame comprises a chassis 21 including an assembly of small girders made of metal or concrete which, according to the embodiment, forms a substantially rectangular base. At least one part of the framework formed by the girders has a floor 22 in its lower part. Floor 22 includes a welded sheet of metal, thus forming troughs which will contain ballast, such as ballast blocks 23, after the frame chassis 21 has been positioned. The base has a shaft or plinth 24 in the center of which a column 25 is fitted. The end of a fixed pipeline 26 is attached to the upper end of column 25, on the axis thereof.

A cylindrical bearing block of hollow arm 19 is mounted on column 25. The end of arm 19 cooperates with mooring head 4 and can be displaced in a horizontal plane through an angle approaching 360°. This angle can be restricted at will to a more or less large segment. According to the particular embodiment shown, the rotational angle intended is in the region of 90°.

The hollow arm 19 consists of a cylindrical portion 27 extending from a conical portion 28. A strut 29 is arranged from one end to the other of the arm 19 on its lower part and in the direction of the axis thereof. The end of strut 29 is situated on the side of the conical portion 28 bears a skid 30 cooperating with a part-annular crown 31 fixed to chassis 21. The strut 29 also serves for the fixing of a device with a stirrup 32 which allows the skid 30 to slide around the crown 31 while at the same time preventing the surfaces of the skid 30 and crown 31 from separating vertically. The strut 29 and the device with the stirrup 32 have the object of ensuring that forces directed vertically upwards do not cause distortion of the arm 19 thus rendering useless the mooring device provided in the cylindrical part of the arm.

The arm 19 features on its upper part, adjacent its vertical axis of rotation, a cable guidance device 33 with a loose or freely rotatable pulley 34. The cylindrical portion 27 of arm 19 is fitted internally with an abutment or stop 35 against which the end of mooring head 4 comes into contact. Thus, stop 35 defines an exact position of the flange 12 borne by mooring head 4 with respect to the end of the fixed pipeline 26.

The locking means 18 for the mooring head is mounted in a manner to project into the path of the mooring head. A spring-loaded pivot device 36 allows locking means 18 to be raised during movement of the end of head 4 until the moment when neck 16 comes opposite locking means 18 which then swings and comes to rest against neck 16 and rim 17. The part connecting the conical portion 28 with the cylindrical portion 27 includes a slot 37 having edges substantially parallel to the generatrix of the conical portion 28. Slot 37 cooperates with the positioning member 20 fixed on mooring head 4. When member 20 is in place in slot 37, the angular positioning of conduit end 9 is accurately determined.

Slot 37 has substantially parallel edges but includes diverging edges extended toward the opening of the conical portion 28. These edges diverge at such an angle that when mooring head 4 is in place, the outer surface of conduit end 9 is near the diverging edges, but not touching them, in order to prevent damage to the protective sheathing of conduit 1.

The conical portion 28 assists the introduction of mooring head 4 into the arm 19 and allows its exact positioning.

A handling lug 38 is located on the upper part of cylindrical portion 27 and permits the placing of arm 19 on column 25 and crown 31. This operation of mounting arm 19 is carried out before submersion and obviously before fixing the pipeline to the upper end of column 25.

Stop means 39 may be provided in order to keep arm 19 in its definite position when conduit 1 is moored, in order to avoid any movement which might be produced by underwater currents.

When conduit 1 is moored and float 13 is freed, a junction pipe 40 is connected to the flanges of pipeline 26 and conduit 1 in order to effect the coupling of conduit 1 to the submarine structure, for example, a submerged storage tank having pipeline 26 fixed to column 25 of the mooring frame. According to a preferred shape, this junction pipe 40 has an inverted U shape so as to provide a certain amount of elasticity to compensate for deviation due to constructional tolerances which can exist between the alignment of the junction pipe flanges and the flanges of the pipeline and the conduit.

The method of mooring a submarine conduit, including a mooring head, as described above, to a frame, in accordance with the invention, avoids the intervention of divers to complete the operation.

The submerging of the frame, as well as the connecting of the pipeline 26, will not be described in detail. It suffices to know that the connecting of the pipeline 26 to column 25 of arm 19 can be done on the surface or at shallow depth, at the start, for example, of the construction of the structure to be submerged which is to be connected to conduit 1. The frame is then submerged together with the structure. If the frame is intended to be submerged at moderate depth, connection of the pipeline 26 can be done by divers.

The frame is submerged, a hauling cable 15 being wrapped around the pulley 34 and then passed into and through cylindrical part 27 of arm 19 to emerge from the opening of conical portion 28. The two ends of this cable 15 are kept on the surface.

The conduit 1, in hydrostatic equilibrium, equipped with a float system 2 and guide rope 3 as shown in FIG. 1, is towed toward the mooring frame. The end of conduit 1 is brought to the surface or to a shallow depth where the mooring head 19, described above, is attached to conduit 1 and closing valve 11 is connected thereto. Float 13 compensates for the weight of mooring head 4 and keeps the outlet of conduit 1 in an attitude approximating to that which it will have when moored. One end of a towing cable is attached to mooring head 4 by the expandable fixing means 14, and the assembly of conduit 1 and mooring head 4 is submerged until it assumes a position substantially parallel to the sea bottom. The other end of the towing cable is then attached, on the surface, to the end of the hauling cable 15 which emerges from the cone portion 28 of arm 19 after passing over pulley 34. Hauling cable 15 is then wound in by a winch on the surface, drawing the towing cable until this is taken up by the winch and drags the mooring head 4, fixed to conduit 1, into the conical portion 28 of arm 19, and thus into the mooring position. The expandable fixing means 14 are then actuated to free the towing cable 15 from the mooring head, the towing cable then being brought to the surface.

The lightener float 13 is freed and the junction pipe 40 is fixed in place between the conduit 9 and the pipeline 26.

According to a variation of the method, the hauling cable 15 has similar characteristics to the towing cable 15. This allows the hauling cable to serve from the beginning of the operation simultaneously to tow the towing cable fixed to mooring head 4 and conduit 1 through the movable mooring arm 19. The placing of the cable in the cone position 28 of arm 19 can take place in any direction, the end of arm 19 moving on crown 31 in a manner to take up a position corresponding to the minimum frictional force of the cable against the cone position 28 and the body of arm 19.

What we claim is:

1. An assembly for mooring and connecting a submarine conduit to a fixed pipeline, the submarine conduit to be connected being supported in hydrostatic equilibrium by a lightening system, the assembly comprising:
   (a) a mooring head fixed to the end of the conduit to be connected,
   (b) a mooring frame,
   (c) a movable mooring arm displaceable in a horizontal plane on the mooring frame,
   (d) means to locate an end of the pipeline on the rotational axis of the said arm, and
   (e) a junction pipe to connect the end of the conduit to the end of the fixed pipeline.

2. An assembly according to claim 1, wherein the mooring head includes a body which is cylindrical in part attached to the end of the conduit and co-axial therewith, said cylindrical body including a lateral passage for the end of the conduit to be connected, said mooring head further including expandable means for fixing the mooring head to a towing cable, means for mooring the mooring head to the movable mooring arm, and positioning means fixed to the cylindrical body to ensure a definite angular position with respect to the vertical of the end of the conduit to be connected.

3. An assembly according to claim 1, wherein the mooring frame includes a chassis which can be subjected to ballast, a vertical plinth fixed to the said chassis, a column coaxial with the plinth, said movable mooring arm having one end movably mounted around the said column, the other end of the mooring arm having a skid,
   a part-annular crown coaxial with the column fixed to the chassis and cooperating with the skid, and a device preventing the skid separating from the crown.

4. An assembly according to claim 3, wherein fixing means are provided on the crown and on the skid to fix the mooring arm in the final position after mooring the conduit.

5. An assembly according to claim 1, wherein the movable mooring arm has a rotatably mounted end and comprises a cylindrical hollow portion and a conical portion,
   said cylindrical portion has a diameter allowing the passage of a cylindrical part of the mooring head, and
   the conical portion extends said cylindrical portion on the side of its movable end,
   a pulling line guidance fixed on the cylindrical portion near the rotatably mounted end of the mooring arm thereby ensuring guidance of a pulling line from the outside to the inside of the cylindrical portion,
   an abutment device is located on the inside of the cylindrical portion for limiting movement of the mooring head therein,
   mooring means is located on the mooring head,
   a locking device passes through the wall of the cylindrical portion to cooperate with said mooring means,
   a slot located at the movable end of the cylindrical portion of the mooring arm cooperates with positioning means disposed on the mooring head, said slot including diverging edges which diverge toward the opening of the conical portion and parallel edges continuing from said diverging edges to permit the passage of the positioning means and of the end of the conduit to be connected.

6. An assembly according to claim 5, wherein a strut is provided along the lower generatrix of the mooring arm from one end to the other thereof.

7. An assembly according to claim 1, wherein positioning means for the mooring head are fixed in the vertical plane passing through the axis of the end of the conduit to be connected.

8. An assembly according to claim 1, wherein the junction pipe is in the shape of a U.

9. A method of employing the device according to claim 1, wherein
 (a) a hauling cable is passed over cable guiding means located at one end of the mooring arm,
 (b) one end of said cable emerges from the movable mooring arm while the two ends of the cable are held on the surface,
 (c) the end of a towing cable is attached to the hauling cable,
 (d) the end of the conduit to be connected rising vertically on the body of the mooring head is fitted with a float to keep it in its mooring position,
 (e) the towing cable is attached to the end of the mooring head,
 (f) the conduit is submerged, the end of the towing cable is attached to the end of the hauling cable,
 (g) the hauling cable is hauled by a winch until the towing cable reaches the winch,
 (h) the towing cable is attached to the winch and hauled thereby dragging the conduit into the movable arm of the mooring frame,
 (i) expandable means of attachment are actuated, when the mooring head is moored, to detach the towing cable from the mooring head,
 (j) the float supporting the end of the conduit is freed, and
 (k) the junction pipe is put in place between the end of the conduit and the end of the fixed pipeline.

10. A method according to claim 9, wherein the hauling cable is used as a towing cable.

11. An assembly for mooring and connecting a submarine conduit to a fixed pipeline, the assembly comprising:
 (a) a mooring head, a mooring frame and a movable mooring arm,
 (b) said head to be fixed to the end of the conduit to be connected to the submarine conduit,
 (c) the movable mooring arm being displaceable about a rotational axis on the mooring frame,
 (d) means to locate an end of the fixed pipeline on the mooring frame, and
 (e) means for drawing the mooring head when fixed to the end of the conduit to the movable mooring arm which is effective to receive the mooring head.

12. An assembly according to claim 11, wherein the movable mooring arm is displaceable in a horizontal plane, and the fixed pipeline is located on said rotational axis.

13. An assembly according to claim 11, wherein a junction pipe is effective to connect the end of the submarine conduit to the end of the fixed pipeline.

14. An assembly according to claim 11, wherein the drawing means includes a pulling line guidance device located at the fixed mooring frame for guiding a pulling line connected to the mooring head to be pulled to the movable mooring arm.

* * * * *